United States Patent
Lim et al.

(10) Patent No.: US 9,813,591 B1
(45) Date of Patent: Nov. 7, 2017

(54) SYSTEMS AND METHODS FOR MANAGING PRINTING USING MULTIPLE COLORANT LEVELS

(71) Applicant: Global Graphics Software Limited, Cambridge (GB)

(72) Inventors: Kian Min Lim, Cambridge (GB); Daniel Joseph Cook, Cambridge (GB)

(73) Assignee: GLOBAL GRAPHICS SOFTWARE LIMITED, Cambridge (GB)

( * ) Notice: Subject to any disclaimer, the term of this patent is extended or adjusted under 35 U.S.C. 154(b) by 0 days.

(21) Appl. No.: 15/210,295

(22) Filed: Jul. 14, 2016

(51) Int. Cl.
H04N 1/46 (2006.01)
H04N 1/60 (2006.01)
H04N 1/40 (2006.01)
H04N 1/405 (2006.01)

(52) U.S. Cl.
CPC ......... *H04N 1/6027* (2013.01); *H04N 1/4052* (2013.01); *H04N 1/40087* (2013.01)

(58) Field of Classification Search
None
See application file for complete search history.

(56) References Cited

U.S. PATENT DOCUMENTS

| | | | | |
|---|---|---|---|---|
| 5,363,318 A * | 11/1994 | McCauley | ........... | H04N 1/6027 348/E17.005 |
| 6,229,624 B1 * | 5/2001 | Gilman | ................ | H04N 1/6027 345/589 |
| 6,690,490 B1 * | 2/2004 | Murakami | ........... | H04N 1/4078 358/1.9 |
| 7,199,903 B2 | 4/2007 | Van de Capelle et al. | | |
| 7,446,900 B2 * | 11/2008 | Kise | ....................... | H04N 1/603 358/1.9 |
| 7,586,657 B2 | 9/2009 | Ohga | | |
| 8,358,440 B2 * | 1/2013 | Ernst | .................... | H04N 1/6033 358/1.9 |
| 8,437,039 B2 | 5/2013 | Murata | | |
| 8,542,405 B2 | 9/2013 | Fischer et al. | | |
| 8,564,861 B2 * | 10/2013 | Henderson | ........... | H04N 1/6033 358/1.9 |

(Continued)

OTHER PUBLICATIONS

Invention Disclosure for U.S. Appl. No. 15/210,295, filed Jul. 14, 2016.

*Primary Examiner* — Dung Tran
(74) *Attorney, Agent, or Firm* — Lowe Graham Jones PLLC; Bruce E. Black

(57) ABSTRACT

A method of determining multi-level printing parameters for a printing device includes identifying printing parameters for each of multiple colorant levels; providing at least one density measurement at a known coverage for each colorant level; providing an aim curve relating input tone value to printed density value; and identifying multiple test parameter sets. The method further includes, for each of the test parameter sets at each of multiple input tone values, determining a printed density value based on the parameters of the test parameter set and the density measurements, and determining an error value from differences between the determined printed density values and the aim curve. The method also includes selecting one of the test parameter sets using the determined error values; and communicating the selected one of the plurality of test parameter sets for receipt by the printing device for printing documents. Systems and software can employ the method.

20 Claims, 3 Drawing Sheets

(56) References Cited

U.S. PATENT DOCUMENTS

| | | | |
|---|---|---|---|
| 8,570,626 B2 | 10/2013 | Arregui et al. | |
| 2002/0085233 A1* | 7/2002 | Degani | H04N 1/407 358/3.06 |
| 2006/0001892 A1 | 1/2006 | Bai | |
| 2010/0134858 A1* | 6/2010 | Minamino | H04N 1/6027 358/504 |
| 2012/0086983 A1* | 4/2012 | Taylor | H04N 1/4078 358/3.01 |

* cited by examiner

SYSTEMS AND METHODS FOR MANAGING PRINTING USING MULTIPLE COLORANT LEVELS

FIELD

The invention relates to systems and method for managing printing using multiple colorant levels. The invention also relates to systems and method for determining printing parameters for printing using multiple colorant levels, as well as methods and systems for using the determined printing parameters.

BACKGROUND

A multi-level digital print device can lay down different amounts of colorant at each addressable location on the media using multiple levels for one or more of the colorants. This ability is common for digital inkjet printing devices and electrophotographic (EP, toner) printers.

Several different approaches have been used for the physical application of the colorant to the media. For inkjet devices, for instance, any of the following may be used: (1) The print head moves across the media multiple times, emitting ink drops on every pass. Each location on the media may receive zero, one, or more drops. (2) The media moves beneath a 'grayscale' print head, where each nozzle is capable of delivering a variety of different drop sizes on demand. (3) The media moves beneath a series of print heads, each nozzle of which can emit a single drop size, but each addressable location on the media may have a drop placed by zero, one, or more heads. (4) The media moves below a series of print heads, which contain nozzles, each of which can deliver a single drop size, but where different nozzles can emit different drop sizes. This list is not intended to be exhaustive.

The amounts of colorant that can be applied in any location on the media form discrete steps. Throughout this document the term "colorant level" is used to describe one of these steps. A RIP (raster image processor) or screening engine that delivers rasters for imaging by the printer marking engine may or may not wrap the screened raster in different ways, depending on how the multiple levels of colorant are applied, but the same screening principles apply in all cases.

A screening technology designed for multi-level screening typically defines a response curve for each colorant level. The response curve, for each input tone value, determines what percentage of the addressable locations on the media should be covered with that colorant level.

The PostScript Language Reference Manual discusses promotion of binary (1-bit) screens to multi-level screens by dividing the full tonal range into a number of sub-ranges equal to the number of colorant levels. The first colorant level may be filled, for example, from 0 to 100% coverage through a first sub-range of tones (for example, 0 to 0.7), and then the second colorant level may replace that first colorant level through a second sub-range of tones (for example, 0.7 to 0.9), and so on.

This approach has several challenges or difficulties in practice. First, there are often artifacts at the cross-over points between colorant levels. For example, the transition from one colorant level to the next can exhibit less texture than at other tone values. This can be particularly visible across long, smooth tonal graduations. Second, the approach assumes that the incremental tonal contribution from each colorant level will be more or less equal. In practice, this assumption is usually not justified. Multi-level screens are typically non-linear. The first level often accounts for most of the output tonal range. Third, the approach constrains the screen design to use the same pattern of coverage within the screen for every colorant level when, in contrast, it may be valuable to use different patterns of coverage.

The sub-range over which each colorant level is used is therefore normally adjusted to more or less in line with the density achievable with that colorant level, and those ranges may also be overlapped to avoid texture artefacts at the cross-over points. In some cases, colorant levels do not make use of their full potential coverage because that causes additional challenges, e.g. ink failing to dry on an inkjet printer or toner flaking from an EP printer.

There is a need for methodologies to determine a tone response curve for each colorant level that matches or approximates an aim curve (i.e., a target curve).

BRIEF SUMMARY

One embodiment is a method of determining multi-level printing parameters for a printing device. The method includes identifying (for example, by selection of, or having a predetermined set of) a plurality of printing parameters for each of a plurality of colorant levels; providing at least one density measurement at a known coverage for each of the plurality of colorant levels; providing an aim curve relating input tone value to printed density value; and identifying a plurality of test parameter sets, each test parameter set including a value for each of the plurality of printing parameters for each of the plurality of colorant levels. The method further includes, for each of the plurality of test parameter sets at each of a plurality of input tone values, determining a printed density value based on the parameters of the test parameter set and the density measurements, and determining an error value from differences between the determined printed density values and the aim curve. The method also includes selecting a one of the of the plurality of test parameter sets using the determined error values; and communicating the selected one of the plurality of test parameter sets for receipt by the printing device for printing documents using the selected one of the plurality of test parameter sets and the plurality of colorant levels.

Another embodiment is a non-transitory computer-readable medium having processor-executable instructions for determining multi-level printing parameters for a printing device, the processor-executable instructions when installed onto a device enable the device to perform actions, including: receive an identification of a plurality of printing parameters for each of a plurality of colorant levels; receive at least one density measurement at a known coverage for each of the plurality of colorant levels; receive an aim curve relating input tone value to printed density value; and identify a plurality of test parameter sets, each test parameter set including a value for each of the plurality of printing parameters for each of the plurality of colorant levels. The actions also include, for each of the plurality of test parameter sets at each of a plurality of input tone values, determine a printed density value based on the parameters of the test parameter set and the density measurements, and determine an error value from differences between the determined printed density values and the aim curve. The actions further include select a one of the of the plurality of test parameter sets using the determined error values; and communicate the selected one of the plurality of test parameter sets for receipt by the printing device for printing documents using the selected one of the plurality of test parameter sets and the plurality of colorant levels.

Yet another embodiment is a system for determining multi-level printing parameters for a printing device. The system includes a computer processor configured and arranged to perform the following actions: receive an identification of a plurality of printing parameters for each of a plurality of colorant levels; receive at least one density measurement at a known coverage for each of the plurality of colorant levels; receive an aim curve relating input tone value to printed density value; and identify a plurality of test parameter sets, each test parameter set including a value for each of the plurality of printing parameters for each of the plurality of colorant levels. The actions also include, for each of the plurality of test parameter sets at each of a plurality of input tone values, determine a printed density value based on the parameters of the test parameter set and the density measurements, and determine an error value from differences between the determined printed density values and the aim curve. The actions further include select a one of the of the plurality of test parameter sets using the determined error values; and communicate the selected one of the plurality of test parameter sets for receipt by the printing device for printing documents using the selected one of the plurality of test parameter sets and the plurality of colorant levels. In at least some embodiments, the system further includes the printing device. In at least some embodiments, the processor is part of the printing device.

In at least some embodiments, the method or actions further include, for each of the plurality of test parameters sets at each of a plurality of input tone values, determining a smoothness of the density curve associated with the test parameter set. In at least some embodiments, selecting a one of the of the plurality of test parameter sets includes selecting a one of the of the plurality of test parameter sets using the determined error values and smoothness.

In at least some embodiments, selecting a one of the of the plurality of test parameter sets includes identifying, from plurality of test parameter sets, a plurality of candidate parameter sets and printing a test sample for each of the plurality of candidate parameter sets and selecting the one of the plurality of test parameter sets from the plurality of candidate parameter sets using the test samples. In at least some embodiments, the aim curve is linear. In at least some embodiments, the aim curve is non-linear.

In at least some embodiments, identifying a plurality of test parameter sets includes selecting parameters for the plurality of test parameter sets randomly or pseudo-randomly. In at least some embodiments, the plurality of input tone values ranges from 0 to 1. In at least some embodiments, the plurality of input tone values are selected at regular intervals along a range of input tone values. In at least some embodiments, a sub-range of the input tone values is prioritized using a weighting factor. In at least some embodiments, the printing parameters for at least one of the plurality of colorant levels can define a non-linear, curved tone response curve of that colorant level.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The invention relates to systems and method for managing printing using multiple colorant levels. The invention also relates to systems and method for determining printing parameters for printing using multiple colorant levels, as well as methods and systems for using the determined printing parameters.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1:
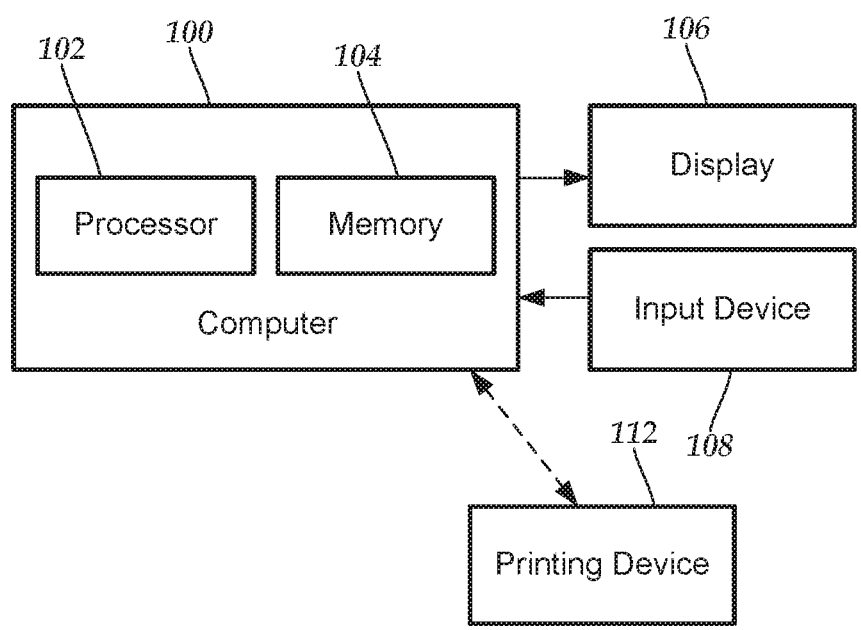
FIG. 1 is a schematic representation of one embodiment of an environment in which the invention can be employed.

FIG. 1 illustrates one embodiment of a system for practicing the invention. The system can include a computer 100 or any other device that includes a processor 102 and a memory 104, a display 106, an input device 108, and a printing device 112, such as a printer or press.

The computer 100 can be a laptop computer, desktop computer, tablet, mobile device, smartphone or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 102. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Figure 2:
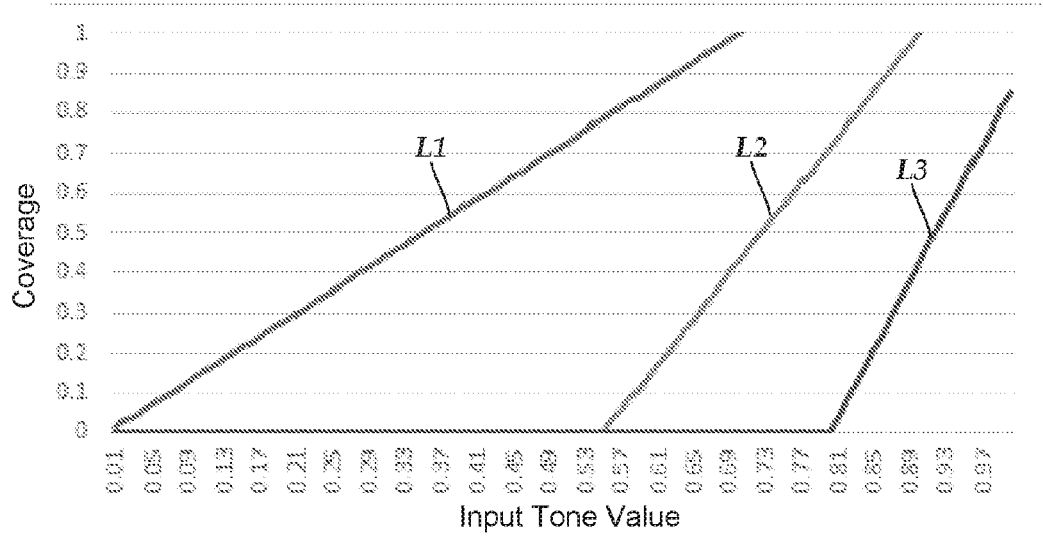
FIG. 2 is a schematic graph of input tone value versus coverage for three colorant levels.
Figure 3:
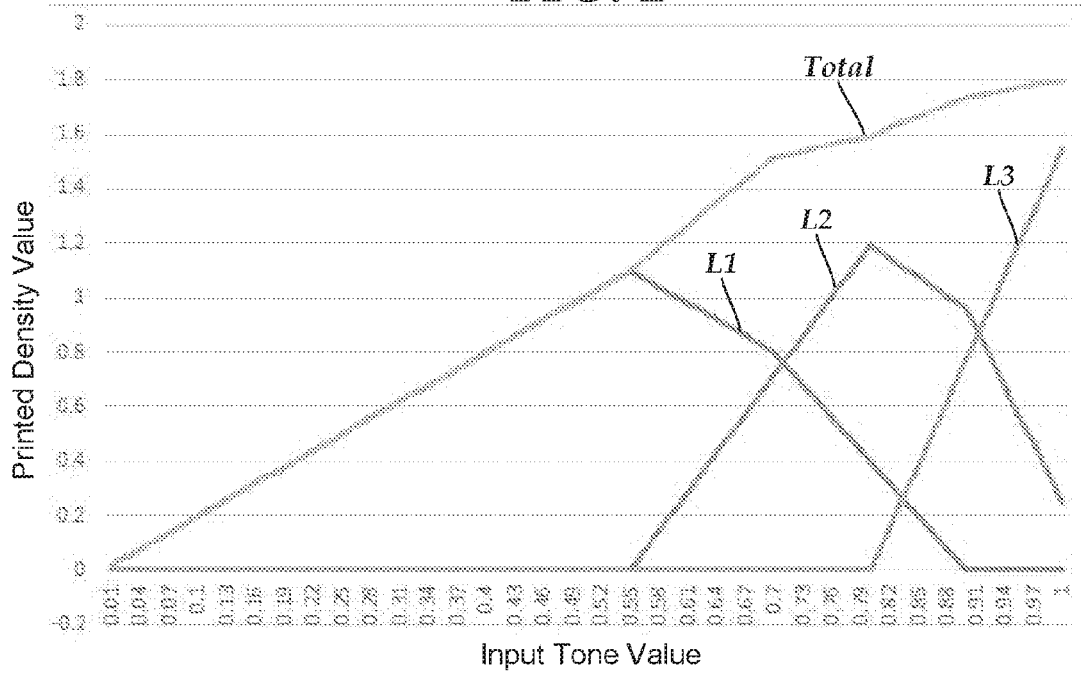
FIG. 3 is schematic graph of a total density curve based on three colorant levels.

FIG. 2 illustrates one example of a colorant with three levels, L1, L2, L3, and the resulting density of coverage at that level versus input tone value. As can be seen, the input tone values overlap and have different slopes. FIG. 3 illustrates one example of a total tone response curve ("Total") resulting from the combination of tone response curves for three levels, L1, L2, L3.

Ideally, accurate color representation on the printer is such that the actual overall tone response curve (for example, as illustrated in FIG. 3) resulting from the combination of the tone response curves for each colorant both matches an aim curve (e.g., a target tone response curve) for tone reproduction and does not include any significant discontinuities.

In some embodiments, the aim curve has a linear response (e.g. so that a 50% tone in the job being rendered achieves 50% of the density on the printed piece of that at 100% tone from the job). Alternatively, it may be a convex or concave curve, or can be selected to emulate another print technology. For example, it may be desired to ensure that a UV inkjet press can emulate the tone response curve of a flexographic printing press.

With respect to discontinuities, if the curve is not smooth it can be very difficult to apply additional color management controls such as generation and application of color profiles according to the ICC specification, or generation and application of 1D calibration curves. A sharp change in the rate of change of density with input tone value can also introduce Mach banding (e.g., an exaggerated contrast between edges of slightly differing shade) which is far more apparent to the human eye than it is to measurement instruments.

As can be seen in the example shown in FIG. 3, the overall tone response curve may not be a smooth curve, and may include some discontinuities. For example, in FIG. 3, discontinuities are particularly present in the range of 70 to 80%.

Both the tone response curves for individual colorant levels, and the summed overall response curve, may be device dependent. In some embodiments, a single approach to generating curves can be used for all instances of a particular model and configuration of printing device. In other embodiments, different curves may be used for each combination of an individual printing device with a specific media.

Methodologies to determine the parameters to produce a suitable tone response curve for each colorant level are described herein. The response curves for the individual colorant levels are selected to closely match the aim curve and, at least in some embodiments, do not include significant discontinuities. The methods described herein may be used to relatively quickly and easily determine the printing parameters and tone response curves.

The tone response curve is not the only factor that affects the final quality of a multi-level screen on a particular device. The artifacts at cross-over points are another. In addition, some combinations of colorant level/coverage can result in texture effects that are variously described as coalescing, mottling and streaking. In at least some embodiments, these factors can be controlled or reduced by careful adjustment of the ranges of the tonal scale at which two or more different colorant levels are used together, for example, where the range of the first colorant level overlaps with that of the second and so forth. In at least some embodiments, it may be possible to overlap more than two colorant levels, so that a specific tone value from the job may result in three or more different colorant levels being used together for the output from a single input tone value.

When two or more colorant levels are overlapped, a discontinuity may be introduced in the overall tone response curve, for example, where the rate of change of output density with input tone value changes sharply at the beginning and end of the overlap. Accordingly, the tone response curve for each individual colorant level may be modeled using more than a single straight line. For example, the tone response curve may be a series of multiple straight line segments, or may be a curve.

Figure 4:
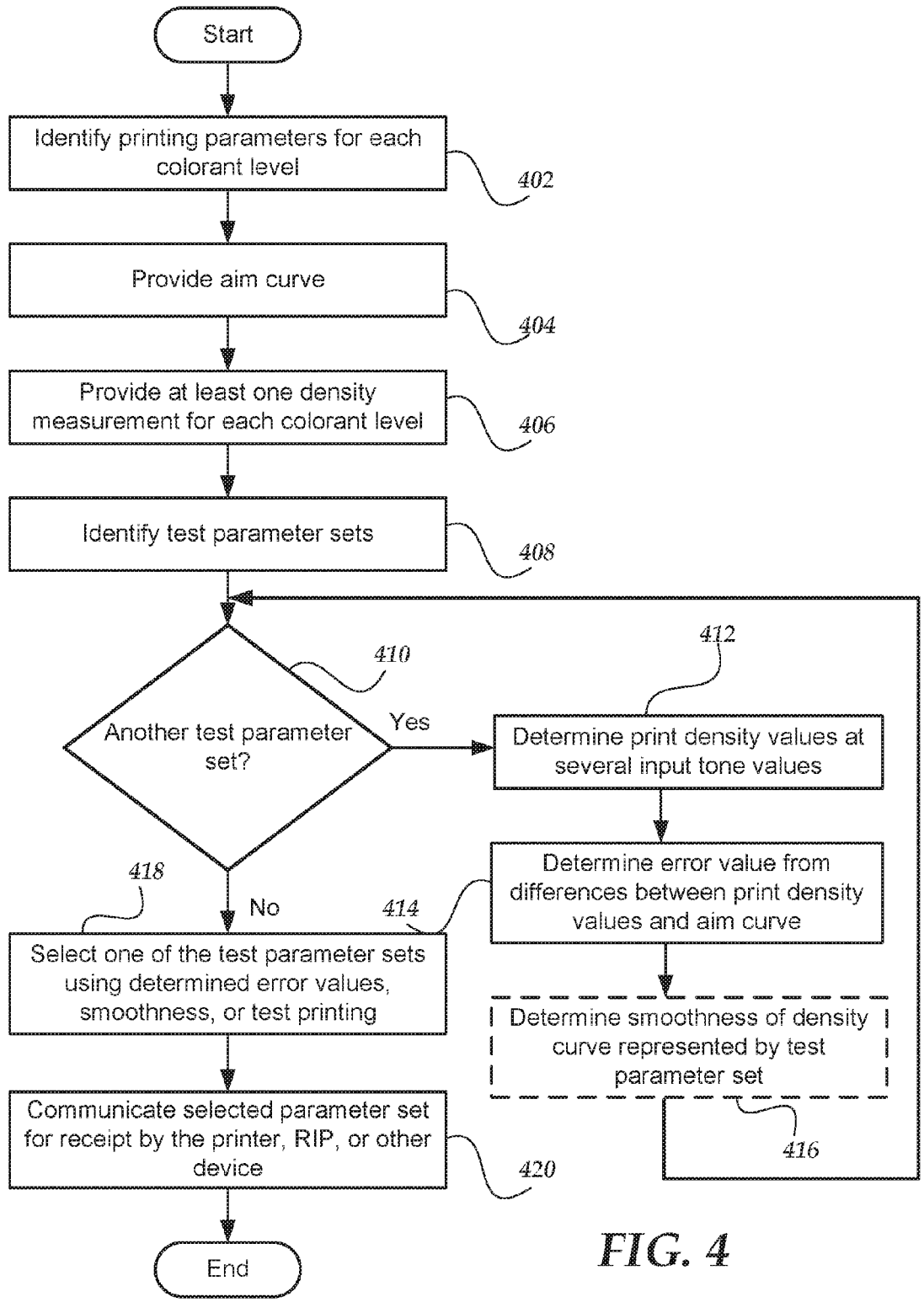
FIG. 4 is a schematic flow chart of one embodiment of determining multi-level printing parameters, according to the invention.

FIG. 4 illustrates one embodiment of a method of determining printing parameters for multiple colorant levels. It will be recognized that this method can be used for any number of colorant levels including two, three, four, five, or more colorant levels. It will also be understood that this method can be used for each individual colorant for a printer or printing device. In some instances, the printing parameters for one colorant may be suitable for another colorant, but this is not necessarily the case universally. Accordingly, the method may be employed for each colorant individually. In addition, the method may be employed for combinations of colorants.

In step 402, multiple printing parameters are identified (for example, selected or predetermined) for each colorant level. This is not the identification of the values of those parameters, but rather the identification of the parameters for which the method will determine values. The identified parameters define the tone response curve for each colorant level.

As one example, based on the colorant levels illustrated in FIG. 2 (for example, using a single straight line for the response curve of each colorant level), the following parameters for each of three colorant levels can be identified: 1) minimum input tone value at which this colorant level is used (e.g., Start X); 2) maximum input tone value at which any new areas of the screening pattern are marked with this colorant level (e.g., End X); and 3) maximum target coverage for this colorant level (e.g., End Y). Examples of other parameters include, but are not limited to, dot shape or minimum target coverage for this colorant leve (e.g., Start Y).

A more sophisticated tone response curve for each colorant, e.g. one using multiple straight line segments, or a curved response, would utilize more parameters. Any identification of parameters can be used. For example, the number of parameters identified (for example, selected or pre-determined) for each colorant level can be two, three, four, five, six, or more. The number and identity of the parameters for each colorant level may be the same. Alternatively, different colorant levels may have a different number of parameters or different identity of the parameters.

In some embodiments of a computer program implementing the method, the number and type of parameters may be pre-defined. In other embodiments, the user may be allowed to select the number or type (or both number and type) of parameters for each colorant level. In some instances, the computer program may allow the user to select from two or more pre-defined parameter configurations. In some instances, the computer program may allow the user to define the number or type of parameters for each colorant level.

In step 404, the desired aim curve (e.g., the desired target tone response curve for the combination of all colorant levels) for the device and colorant is provided. In some embodiments, the aim curve may be pre-defined by the device manufacturer or other individual or company. In other embodiments, the user may provide or design the aim curve.

The aim curve may be linear or non-linear. In some embodiments, the aim curve may be representative of some other printing technology. For example, an aim curve may permit an inkjet press to match the output from a flexographic printing press.

In step 406, at least one density measurement is provided for each colorant level. The density measurement can be a measurement of an actual printed sample at a known coverage amount (for example, 100%, 90%, 75%, 50%, or any other suitable coverage percentage). In some embodiments, the density at 100% coverage is preferred. Alternatively, the density measurement may be an estimate of a density of a printed sample.

The at least one density measurement is provided in order to establish a benchmark between coverage and print density for the particular colorant level. In at least some embodiments, the relationship between coverage and print density is assumed to be linear and a single density measurement may be sufficient. In other embodiments, multiple density measurements can be made at different coverage amounts to define a non-linear relationship between coverage and density.

As an example of step 406, a set of patches can be printed by the printing device to be used, at least one patch for each colorant level, with each patch corresponding to 100% coverage at that colorant level. Each patch can be measured and its density calculated or otherwise determined (for example, using the Yule Nielsen formula or any other suitable method for measurement or determination). In at least some embodiments, multiple patches for the same colorant level may be printed, measured and averaged to compensate for variation across or along the media or over time.

It will be understood that steps 402, 404, and 406 can be performed in any order. Moreover, two or more of these steps can be performed simultaneously.

In step 408, multiple test parameter sets are generated. Each test parameter set contains a value for each of the parameters identified in step 402. Any number of test parameters sets can be generated including, for example, 10, 50, 100, 500, 1000, or more sets. In some embodiments, all of the sets are generated prior to proceeding to step 410. In other embodiments, additional sets may be generated during, or after, steps 410, 412, 414, and 416.

Any method or mechanism can be used for generating the test parameter sets. For example, the sets may be generated randomly or pseudo-randomly. For example, a Monte Carlo random walk approach may be used for random selection of the test parameter sets. In some embodiments, one or more constraints may be placed on the selection of acceptable test parameter sets. Such constraints could include one or more of the following: a) requiring that each individual response curve rises monotonically, at least until it starts to overlap with the next colorant level, b) using gradient descent or other tests to avoid combinations of parameters that are highly likely to not be valuable; c) artificially constraining the number of colorant levels (for example, to two colorant levels) that may be used at any single point on the input tone curve; d) avoiding specific coverage ranges of certain colorant levels that are known to lead to artifacts in printed output; or e) limiting the maximum amount of colorant to be applied; or any other suitable constraints. The use of constraints may make the process more efficient, may reduce computational time, and may increase the likelihood of suitable results.

For every test parameter set (step 410), a density value, for each of multiple input tone values, is determined based on the values of the parameters of the set, (step 412). Any number of input tone values can be selected. In some embodiments, input tone values are selected along the entire range of 0 to 1 (or a subset of that range such as, for example, 0.1 to 1). The input tone values in this range may be selected at regular or irregular steps. Any suitable number of steps can be selected. As an example, the number of steps can be 256 as this equates to the number of input tone values from an eight-bit contone raster. Other examples of suitable numbers of steps can be 512 or 1024 or any other number.

In at least some embodiments, the density value for each tone value is calculated by calculating the coverage of each colorant level in the screened output that would be applied at that tone level based on the test parameters of the set. As another example, the overall density can be estimated as the sum of ("% coverage"×"density at 100%") for all colorant levels. As yet another example, if the measurements indicate a non-linear tonal response then the calculation may be more complex and make use of that additional data, for example, using linear or non-linear interpolation between the physical density measurements. In at least some embodiments, the "% coverage" will differ depending on whether tile-based or error-diffusion screening is in use, and if the same screening pattern within a tile is used for each colorant level.

In step 414, an error value is calculated based on differences from the density values determined in step 412 and the aim curve. For example, the error value may be determined from a set of individual errors calculated for each input tone value in the sequence of input tone values described above, where each individual error is the absolute difference between density value of the aim curve for that tone level and the density value determined in step 412. In some embodiments, the error value can be a sum or average of the individual absolute error values for each input tone value. In other embodiments, the individual error values of particular input tone values, or sub-ranges of input tone values, may be prioritized by using weighting factors.

Optionally, in step 416 the density curve represented by the test parameter set may be assessed for smoothness. In at least some embodiments, any density curves that are not strictly monotonic may be rejected immediately. Smoothness of the density curve can be determined based on any suitable known method including, but not limited to, methods that assess differences in the rate of change of the response across the tone range. As one example, the deviation from a monotone polynomial curve/regression on the target output may be determined. The assessment of smoothness may facilitate reducing the density error value from an aim curve.

After processing all of the test parameter sets, in step 418, one or more of the test parameter sets is selected based, at least in part (or entirely), on the determined error value and the optional smoothness determination. In at least some embodiments, a small number of test parameter sets are selected as having both a small error value and a high smoothness value, and therefore being most likely to produce high quality output.

In at least some embodiments, four, six, or eight sets are selected. In some embodiments, a final parameter set can be selected solely on the basis of the determined error value, with or without the smoothness determination.

In other embodiments, a number of test parameter sets are used for printing samples to aid in the selection of the final parameter set. For example, the RIP or screening engine used to convert rasters for the printing device is configured to use each of these test parameter sets in turn, and a sample (for example, a number of sample pages) are physically printed. In at least some embodiments, the samples include flat tints at various tone levels, full-color and single-separation images and long, smooth graduated tints. The long, smooth graduated tints are particularly useful in assessing the test parameter sets. Any discontinuity in tonal response is often clear in these patches, and so are other artifacts that are not directly related to tonal response, such as mottling or streaking. These artifacts can be assessed visually, rather than relying solely on the error value/smoothness determinations to select a parameter set.

In step 420, a single parameter set is selected and the printer, other printing device, RIP, or screening engine is configured to use that parameter set for normal printing. In at least some embodiments, the parameter set is automatically selected by the system or processor. In at least some embodiments, the parameter set can be selected by a user or the user may be allowed to modify or change the automatic selection of the system or processor.

The methods described herein may have one or more advantages. For example, these methods may provide faster development of parameters for a family of printing devices, an individual printing device, or a combination of a printing device with a specific media. Another possible advantage is a process in which most of the complex steps can be automated, therefore making it accessible to non-experts for use in, for instance, a printing company as opposed to requiring an expert consultant, a technology provider or a printing device vendor to perform the process. Another possible advantage is achieving a better screening configuration in comparison to other methods to reduce artifacts arising from non-linear response curves, or from non-linear calibration or color profiling transforms, and therefore raise overall output quality.

As indicated above, in at least some embodiments, the method described above is performed for each colorant (for example, cyan, magenta, yellow, and black) individually. In many instances, the density values and aim curves are different for each colorant.

It will be understood that each block of the flowchart illustration, and combinations of blocks in the flowchart illustration and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A method of determining multi-level printing parameters for a printing device, the method comprising;
   identifying a plurality of printing parameters for each of a plurality of colorant levels;
   providing at least one density measurement at a known coverage for each of the plurality of colorant levels;
   providing an aim curve relating input tone value to printed density value;
   identifying a plurality of test parameter sets, each test parameter set comprising a value for each of the plurality of printing parameters for each of the plurality of colorant levels;
   for each of the plurality of test parameter sets at each of a plurality of input tone values,
      determining a printed density value based on the printing parameters of the test parameter set and the density measurements, and
      determining an error value from differences between the determined printed density values and the aim curve;
   selecting a one of the plurality of test parameter sets using the determined error values; and
   communicating the selected one of the plurality of test parameter sets for receipt by the printing device for printing documents using the selected one of the plurality of test parameter sets and the plurality of colorant levels.

2. The method of claim 1, further comprising, for each of the plurality of test parameters sets at each of a plurality of input tone values, determining a smoothness of a density curve associated with the test parameter set.

3. The method of claim 2, wherein selecting a one of the plurality of test parameter sets comprises selecting a one of the plurality of test parameter sets using the determined error values and smoothness.

4. The method of claim 1, wherein selecting a one of the plurality of test parameter sets comprises identifying, from plurality of test parameter sets, a plurality of candidate parameter sets and printing a test sample for each of the plurality of candidate parameter sets and selecting the one of the plurality of test parameter sets from the plurality of candidate parameter sets using the test samples.

5. The method of claim 1, wherein the aim curve is linear.

6. The method of claim 1, wherein the aim curve is non-linear.

7. The method of claim 1, wherein identifying a plurality of test parameter sets comprises selecting parameters for the plurality of test parameter sets randomly or pseudo-randomly.

8. The method of claim 1, wherein the plurality of input tone values ranges from 0 to 1.

9. The method of claim 1, wherein a sub-range of the input tone values is prioritized using a weighting factor.

10. The method of claim 1, wherein the printing parameters for at least one of the plurality of colorant levels can define a non-linear, curved tone response curve of that colorant level.

11. A non-transitory computer-readable medium having processor-executable instructions for determining multi-level printing parameters for a printing device, the processor-executable instructions when installed onto a device enable the device to perform actions, including:
  receive an identification of a plurality of printing parameters for each of a plurality of colorant levels;
  receive at least one density measurement at a known coverage for each of the plurality of colorant levels;
  receive an aim curve relating input one value to printed density value;
  identify a plurality of test parameter sets, each test parameter set comprising a value for each of the plurality of printing parameters for each of the plurality of colorant levels;
  for each of the plurality of test parameter sets at each of a plurality of input tone values,
    determine a printed density value based on the printing parameters of the test parameter set and the density measurements, and
    determine an error value from differences between the determined printed density values and the aim curve;
  select a one of the plurality of test parameter sets using the determined error values; and
  communicate the selected one of the plurality of test parameter sets for receipt by the printing device for printing documents using the selected one of the plurality of test parameter sets and the plurality of colorant levels.

12. The non-transitory computer-readable medium of claim 11, wherein the actions further comprise, for each of the plurality of test parameters sets at each of a plurality of input tone values, determine a smoothness of a density curve associated with the test parameter set.

13. The non-transitory computer-readable medium of claim 12, wherein the action of selecting a one of the plurality of test parameter sets comprises selecting a one of the plurality of test parameter sets using the determined error values and smoothness.

14. The non-transitory computer-readable medium of claim 11, wherein the action of selecting a one of the plurality of test parameter sets comprises identifying, from plurality of test parameter sets, a plurality of candidate parameter sets and printing a test sample for each of the plurality of candidate parameter sets and selecting the one of the plurality of test parameter sets from the plurality of candidate parameter sets using the test samples.

15. The non-transitory computer-readable medium of claim 11, wherein the printing parameters for at least one of the plurality of colorant levels can define a non-linear, curved tone response curve of that colorant level.

16. A system for determining multi-level printing parameters for a printing device, the system comprising:
  a computer processor configured and arranged to perform the following actions:
    receive an identification of a plurality of printing parameters for each of a plurality of colorant levels;
    receive at least one density measurement at a known coverage for each of the plurality of colorant levels;
    receive an aim curve relating input tone value to printed density value;
    identify a plurality of test parameter sets, each test parameter set comprising a value for each of the plurality of printing parameters for each of the plurality of colorant levels;
    for each of the plurality of test parameter sets at each of a plurality of input tone values,
      determine a printed density value based on the printing parameters of the test parameter set and the density measurements, and
      determine an error value from differences between the determined printed density values and the aim curve;
    select a one of the plurality of test parameter sets using the determined error values; and
    communicate the selected one of the plurality of test parameter sets for receipt by the printing device for printing documents using the selected one of the plurality of test parameter sets and the plurality of colorant levels.

17. The system of claim 16, further comprising the printing device.

18. The system of claim 17, wherein the processor is part of the printing device.

19. The system of claim 16, wherein the actions further comprise, for each of the plurality of test parameters sets at each of a plurality of input tone values, determine a smoothness of a density curve associated with the test parameter set.

20. The system of claim 19, wherein the action of selecting a one of the plurality of test parameter sets comprises selecting a one of the plurality of test parameter sets using the determined error values and smoothness.

* * * * *